US010100789B2

(12) United States Patent
Ozaki et al.

(10) Patent No.: US 10,100,789 B2
(45) Date of Patent: Oct. 16, 2018

(54) SADDLE-RIDE TYPE VEHICLE (71) Applicant: HONDA MOTOR CO., LTD., Tokyo (JP)

(72) Inventors: Yoshinobu Ozaki, Wako (JP); Mizuki Fujiwara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 86 days.

(21) Appl. No.: 15/464,046

(22) Filed: Mar. 20, 2017

(65) Prior Publication Data
US 2017/0284347 A1   Oct. 5, 2017

(30) Foreign Application Priority Data

Mar. 30, 2016   (JP) .................................. 2016-069598

(51) Int. Cl.
| | | |
|---|---|---|
| F02M 35/04 | (2006.01) |
| B62K 11/04 | (2006.01) |
| F02M 35/02 | (2006.01) |
| B62J 99/00 | (2009.01) |
| B62K 19/30 | (2006.01) |
| B62J 1/08 | (2006.01) |

(52) U.S. Cl.
CPC ............ *F02M 35/048* (2013.01); *B62J 99/00* (2013.01); *B62K 11/04* (2013.01); *B62K 19/30* (2013.01); *F02M 35/0204* (2013.01); *B62J 1/08* (2013.01)

(58) Field of Classification Search
CPC ..... F02M 35/046; F02M 35/048; B62K 11/04
See application file for complete search history.

(56) References Cited

U.S. PATENT DOCUMENTS

| 9,714,631 B2 * | 7/2017 | Koyama | .............. F02M 35/162 |
| 2017/0113758 A1 * | 4/2017 | Hamaguchi | ............ B62K 11/04 |
| 2017/0241381 A1 * | 8/2017 | Ozaki | .................. F02M 35/048 |

FOREIGN PATENT DOCUMENTS

| JP | 10-86871 A | 4/1998 |
| JP | 3154327 B2 | 4/2001 |
| JP | 3308339 B2 | 7/2002 |
| JP | 2006-182150 A | 7/2006 |

* cited by examiner

*Primary Examiner* — Kevin Hurley
(74) *Attorney, Agent, or Firm* — Birch, Stewart, Kolasch & Birch, LLP (57) ABSTRACT

In a saddle-ride type vehicle in which an air cleaner is arranged inward in a vehicle width direction of at least a pair of left and right main frames and arranged below a riding seat, a cleaner case for the air cleaner is configured long in a longitudinal direction of the vehicle and has a cleaner case main portion storing therein a cleaner element, and a connecting tube connection portion extending forward from the cleaner case main portion so as to be connected to a connecting tube. A pair of left and right side covers covering the cleaner case from opposite sides in the vehicle width direction are supported by side cover supporting portions that are provided on left and right opposite side walls of the cleaner case main portion and the connecting tube connection portion.

10 Claims, 10 Drawing Sheets

SADDLE-RIDE TYPE VEHICLE

BACKGROUND OF THE INVENTION

Field of the Invention

The present invention relates to a saddle-ride type vehicle in which, a riding seat is supported by a vehicle body frame including a head pipe steerably supporting a steering handlebar and a pair of left and right main frames extending rearward from the head pipe, and an air cleaner is arranged inward in a vehicle width direction of at least the pair of left and right main frames of the vehicle body frame and arranged below the riding seat.

Description of the Related Art

Japanese Patent No. 3154327 or the like has made known such a saddle-ride type vehicle in which an air cleaner is arranged below a riding seat and the air cleaner is covered with side covers from lateral sides.

However, in the saddle-ride type vehicle disclosed in Japanese Patent No. 3154327, the side covers are configured to be supported by brackets fixed to a vehicle body frame. Since an interval between the left and right side covers is comparatively enlarged, an improvement is expected from the viewpoint of straddling performance of an occupant riding on a riding seat. However, a capacity drop of the air cleaner caused by thinning a straddling portion in order to improve the straddling performance should be avoided.

SUMMARY OF THE INVENTION

The present invention has been achieved in view of the above-mentioned circumstances, and it is an object thereof to provide a saddle-ride type vehicle configured to achieve both thinning of a straddling portion and securement of a capacity of an air cleaner while covering the air cleaner located below a riding seat from opposite sides with side covers.

In order to achieve the object, according to a first feature of the present invention, there is provided a saddle-ride type vehicle in which, a riding seat is supported by a vehicle body frame including a head pipe steerably supporting a steering handlebar and a pair of left and right main frames extending rearward from the head pipe, and an air cleaner is arranged inward in a vehicle width direction of at least the pair of left and right main frames of the vehicle body frame and arranged below the riding seat, wherein a cleaner case for the air cleaner is configured long in a longitudinal direction of the vehicle, and has a cleaner case main portion and a connecting tube connection portion, the cleaner case main portion storing therein a cleaner element, the connecting tube connection portion extending forward from the cleaner case main portion so as to be connected to the connecting tube, and a pair of left and right side covers are supported by side cover supporting portions, the pair of left and right side covers covering the cleaner case from opposite sides in the vehicle width direction, the side cover supporting portions being provided on left and right opposite side walls of the cleaner case main portion and the connecting tube connection portion.

With the first feature of the present invention, since the cleaner case has the cleaner case main portion and the connecting tube connection portion extending forward from the cleaner case main portion, and the side covers are supported by the side cover supporting portions provided on the left and right opposite side walls of the cleaner case main portion and the connecting tube connection portion, the front portions and the rear portions of the side covers are supported by the cleaner case. With this arrangement, the interval between the air cleaner and the side covers in the vehicle width direction is reduced, and the side covers are avoided from being overhung outward in the vehicle width direction, thereby thinning the straddling portion of the riding seat. For this reason, the straddling performance can be improved. In addition, the capacity of the air cleaner can be also secured.

According to a second feature of the present invention, in addition to the first feature, the first and second side cover supporting portions of the first, second and third side cover supporting portions are provided in two positions, separated in an up-down direction, of a side wall of the cleaner case main portion, the first, second and third side cover supporting portions being provided in three positions of the side wall of the cleaner case so as to support each of the side covers.

With the second feature of the present invention, since the first and second side cover supporting portions of the first to third side cover supporting portions are provided in the two positions, separated in the up-down direction, of the side wall of the cleaner case main portion, the first to third side cover supporting portions being provided to the side wall of the cleaner case so as to support each of the side covers, the side covers are supported in the three positions by the cleaner case. For this reason, the side covers can be stably supported by the cleaner case, and the number of components can be reduced without providing an exclusive member such as a bracket and the like for supporting the side covers on the vehicle body frame side.

According to a third feature of the present invention, in addition to the second feature, the side covers are formed to extend forward beyond a front end of the riding seat as seen in a side view of the vehicle, the side covers each have a rear portion and a front portion supported by the first side cover supporting portion and the third side cover supporting portion of the first to third side cover supporting portions, the first side cover supporting portion being provided to the cleaner case main portion, the third side cover supporting portion being provided to the connecting tube connection portion, and the side covers are each formed with a curved portion, the curved portion being recessed inward in the vehicle width direction between the first and third side cover supporting portions.

With the third feature of the present invention, the rear portion and the front portion of each of the side covers are supported by the first side cover supporting portion and the third side cover supporting portion, the first side cover supporting portion being provided to the cleaner case main portion, the third side cover supporting portion being provided to the connecting tube connection portion, and the side covers are each formed with the curved portion, the curved portion being recessed inward in the vehicle width direction between the first and third side cover supporting portions. For this reason, the straddling performance for the occupant can be further improved, and the riding comfortableness can be improved.

According to a fourth feature of the present invention, in addition to the second feature, the first to third side cover supporting portions are configured to be formed with fitting holes, tip end portions of first to third supporting protruding portions being fitted and supported in the fitting holes, the first to third supporting protruding portions being protuberantly arranged to each of the side covers, and the fitting hole of the first or third side cover supporting portion of the first to third side cover supporting portions is formed long along the longitudinal direction of the vehicle while allowing the tip end portion of the first or third supporting protruding portion fitted into the fitting hole to slide along the longitudinal direction of the vehicle, the first to third side cover supporting portions being provided to the side wall of the cleaner case at intervals in the longitudinal direction of the vehicle.

With the fourth feature of the present invention, the first to third side cover supporting portions are formed with the fitting holes, the tip end portions of the first to third supporting protruding portions being fitted and supported in the fitting holes, the first to third supporting protruding portions being protuberantly arranged to the side covers. The fitting hole of the first or third side cover supporting portion of the first to third side cover supporting portions is formed long along the longitudinal direction of the vehicle, the first or third side cover supporting portion being provided to the rear portion or the front portion of each of the side covers. The first or third supporting protruding portion has the tip end portion formed to be slidable along the longitudinal direction of the vehicle. For this reason, with respect to a straddling and sandwiching load by the legs of the occupant seated on the riding seat on the side covers, the rear portion or the front portion of each of the side covers is slid to the rear side or the front side, thereby the load can be dispersed, and the weight of the side covers can be reduced.

According to a fifth feature of the present invention, in addition to any one of the first to fourth features, the cleaner case has a front portion supported through the connecting tube by an engine body that is mounted in the vehicle body frame, and a rear portion supported by a battery box that is arranged behind the cleaner case and supported by the vehicle body frame.

With the fifth feature of the present invention, the front portion of the cleaner case is supported through the connecting tube by the engine body mounted in the vehicle body frame, and the rear portion of the cleaner case is supported by the battery box supported by the vehicle body frame. With this structure, since the rear portion of the cleaner case is supported by the battery box with a heavy battery stored, the rear portion of the cleaner case is supported with vibration from a vehicle body absorbed, and the rear portion and the front portion of the air cleaner are isolated from vibration from the vehicle body. For this reason, transmission of vibration from the engine body to the side covers can be reduced, and the riding comfortableness can be improved.

According to a sixth feature of the present invention, in addition to the fifth feature, the vehicle body frame includes a pair of left and right rear frames and a pair of left and right seat frames in addition to the head pipe and the pair of left and right main frames, the pair of left and right rear frames extending upward to a rear from lower portions of the main frames, the pair of left and right seat frames each connecting intermediate portions in a longitudinal direction of the main frame and the rear frame to each other and being arranged below the riding seat, and the main frames, the rear frames, and the seat frames are arranged to surround the side covers as seen in the side view of the vehicle.

With the sixth feature of the present invention, as seen in the side view of the vehicle, the side covers are surrounded by the main frames, the rear frames, and the seat frames. With this structure, the side covers can be protected from the load applied from a periphery thereof, by the vehicle body frame, and a direction for applying the load on the side covers is made to be directed to only a direction of supporting the side covers on the cleaner case. For this reason, durability of the supporting portions which support the side covers on the cleaner case can be improved.

According to a seventh feature of the present invention, in addition to the sixth feature, the intermediate portions of the seat frames in the longitudinal direction are formed to be bent inward in the vehicle width direction, and the side covers are arranged in an opening, the opening being configured with the main frames, the rear frames and the seat frames and formed into a triangular shape as seen in the side view of the vehicle.

With the seventh feature of the present invention, the intermediate portions of the seat frames in the longitudinal direction are bent inward in the vehicle width direction. For this reason, the interval between the pair of left and right seat frames can be narrowed in a part where the occupant seated on the riding seat straddles. Also, the side covers are arranged in the opening configured with the main frames, the rear frames and the seat frames and formed into the triangular shape as seen in the side view of the vehicle. For this reason, the straddling space for the occupant can be thinned, and the vehicle body can be miniaturized in the vehicle width direction.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention is explained below with reference to FIG. 1 to FIG. 10 attached hereto. Note that in the explanation below, a front-rear direction, an up-down direction, a left-right direction are directions when viewed by an occupant riding on a two-wheeled motor vehicle.

Figure 1:
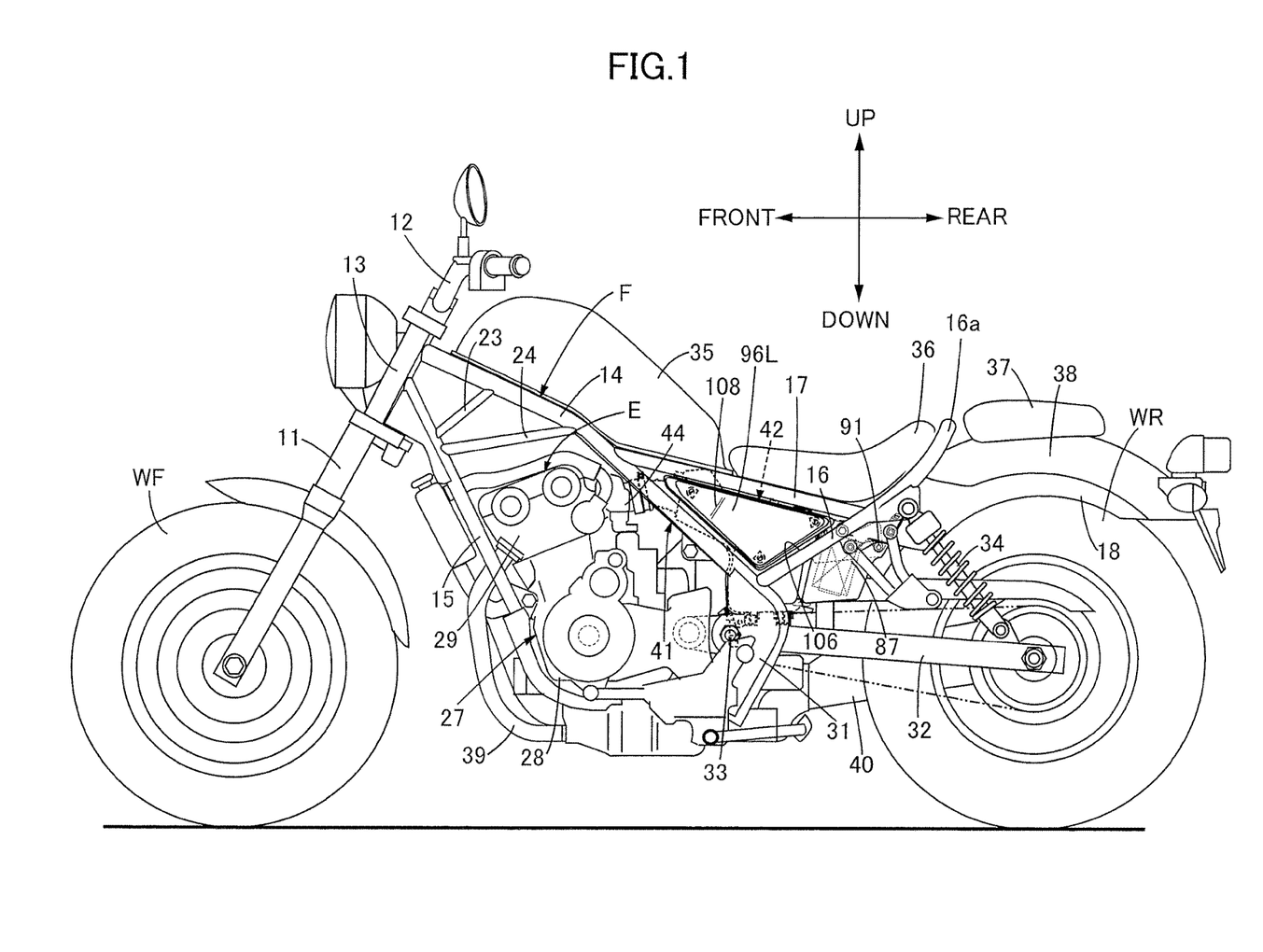
FIG. 1 is a left side view of a two-wheeled motor vehicle.
Figure 2:
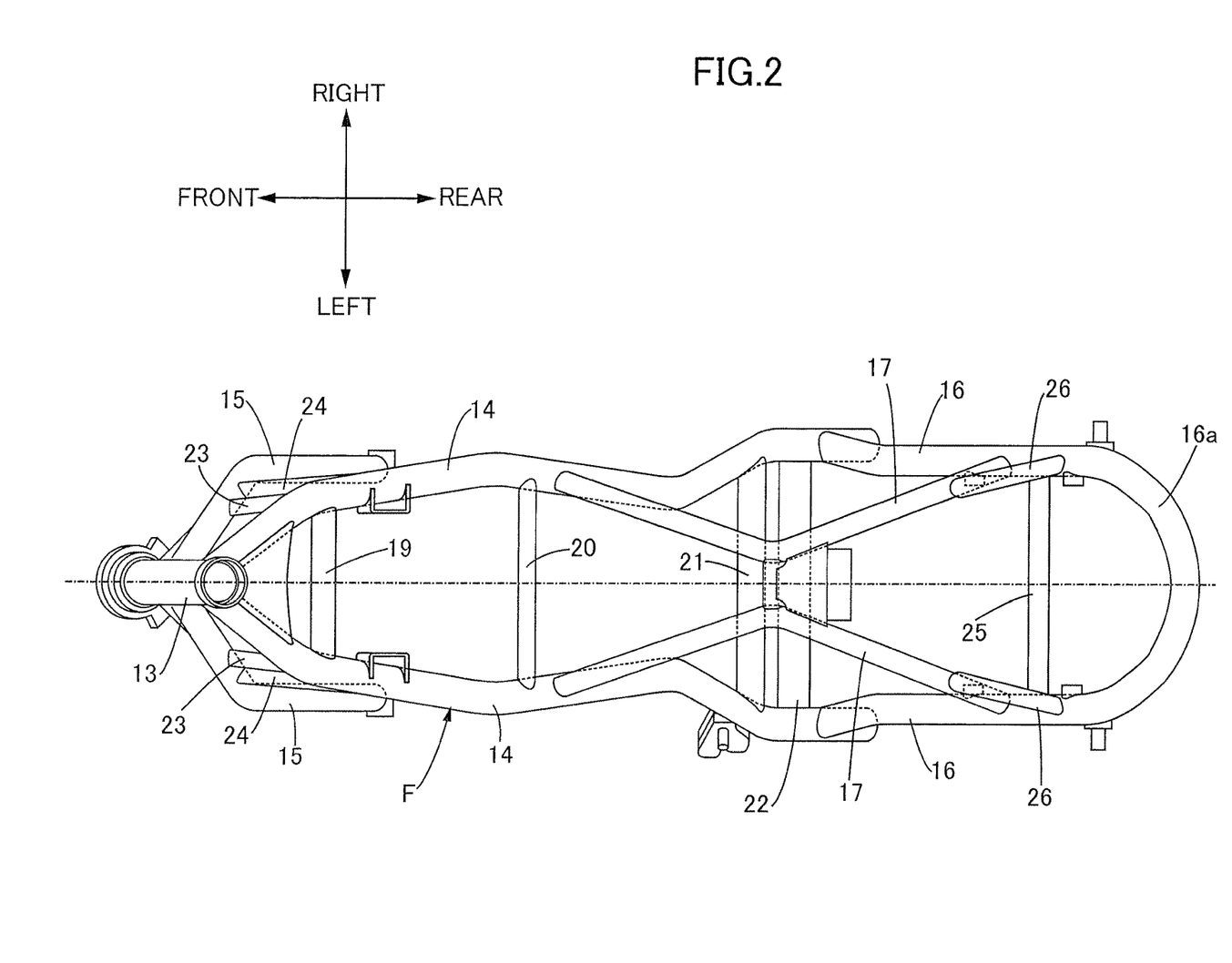
FIG. 2 is a plan view of a vehicle body frame except rear frames.

Firstly, in FIG. 1 and FIG. 2, a vehicle body frame F for a two-wheeled motor vehicle as a saddle-ride type vehicle is provided with a head pipe 13, a pair of left and right main frames 14, a pair of left and right down frames 15, a pair of left and right rear frames 16, a pair of left and right seat frames 17, and an extension frame 18. The head pipe 13 steerably supports a steering handlebar 12 and a front fork 11 pivotally supporting a front wheel WF. The pair of left and right main frames 14 are continuously provided to an upper portion of the head pipe 13, and extends rearward and downward. The pair of left and right down frames 15 are continuously provided to a lower portion of the head pipe 13, and extends rearward and downward at an angle steeper than the main frames 14. The pair of left and right rear frames 16 have front ends respectively continuously provided to lower portions of the pair of left and right main frames 14, extend upward to the rear, and also have rear ends integrally coupled to each other in a substantially C-shaped coupling portion 16a opened forward and obliquely downward in a longitudinal direction of a vehicle body. The pair of left and right seat frames 17 have front ends continuously provided to intermediate portions of the pair of left and right main frames 14 along the longitudinal direction of the vehicle body, are moderately inclined rearward and downward, and also have rear ends continuously provided to intermediate portions of the rear frames 16 along the longitudinal direction of the vehicle body. The extension frame 18 is continuously provided to the rear frames 16, and extends rearward.

First, second, third and fourth cross frames 19, 20, 21, 22 are disposed between the pair of left and right main frames 14 at intervals sequentially from a front side along the longitudinal direction of the vehicle. A reinforcing frame 23 and a reinforcing frame 24 are provided respectively between two positions on the main frame 14 separated from each other in the front-rear direction and two positions on the down frame 15 separated from each other in the front-rear direction. Also, a fifth cross frame 25 is provided between the pair of left and right rear frames 16, and reinforcing frames 26 are respectively provided between the rear portions of the seat frames 17 and the rear portions of the rear frames 16.

Figure 3:
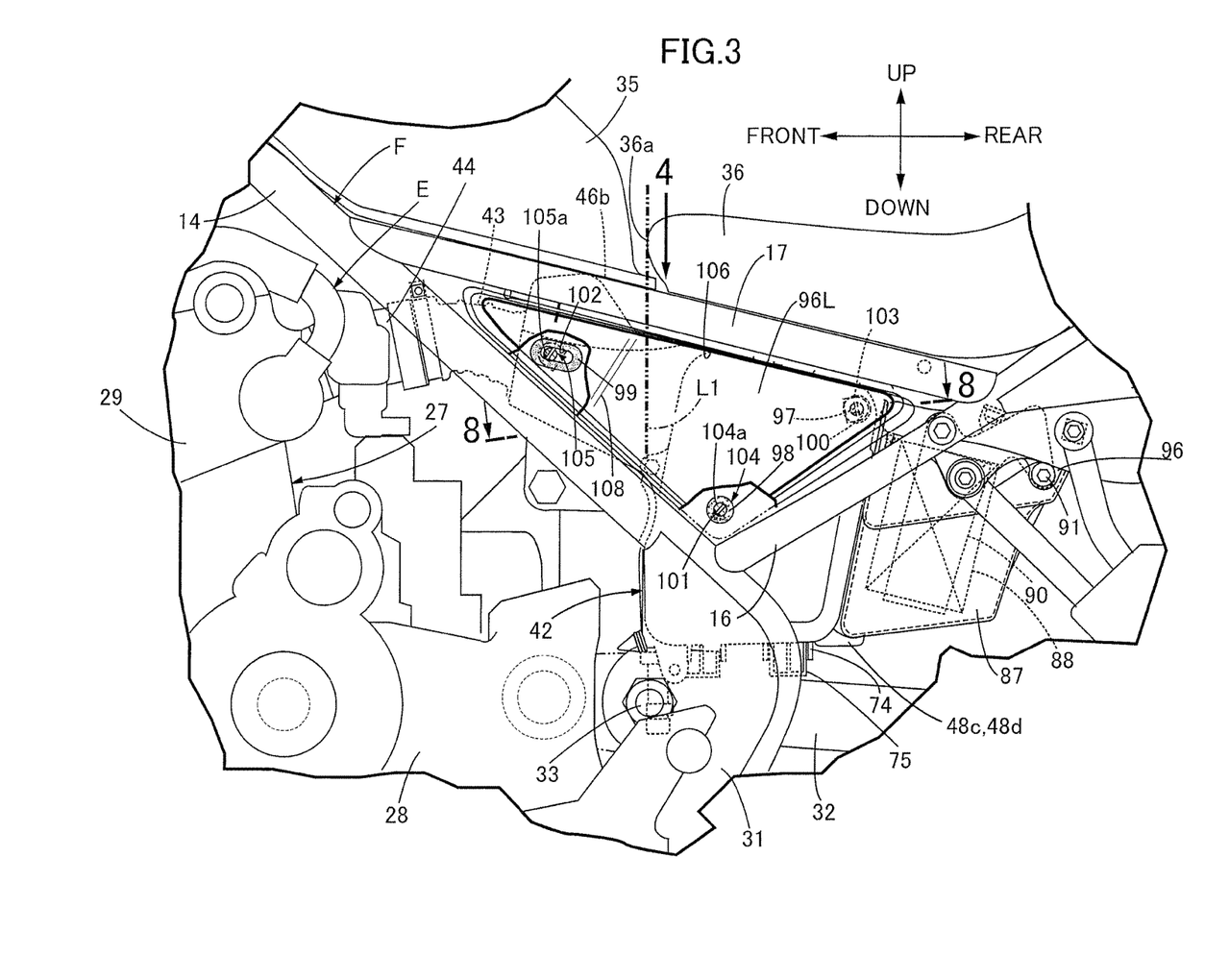
FIG. 3 is an enlarged view of a main portion in FIG. 1.
Figure 4:
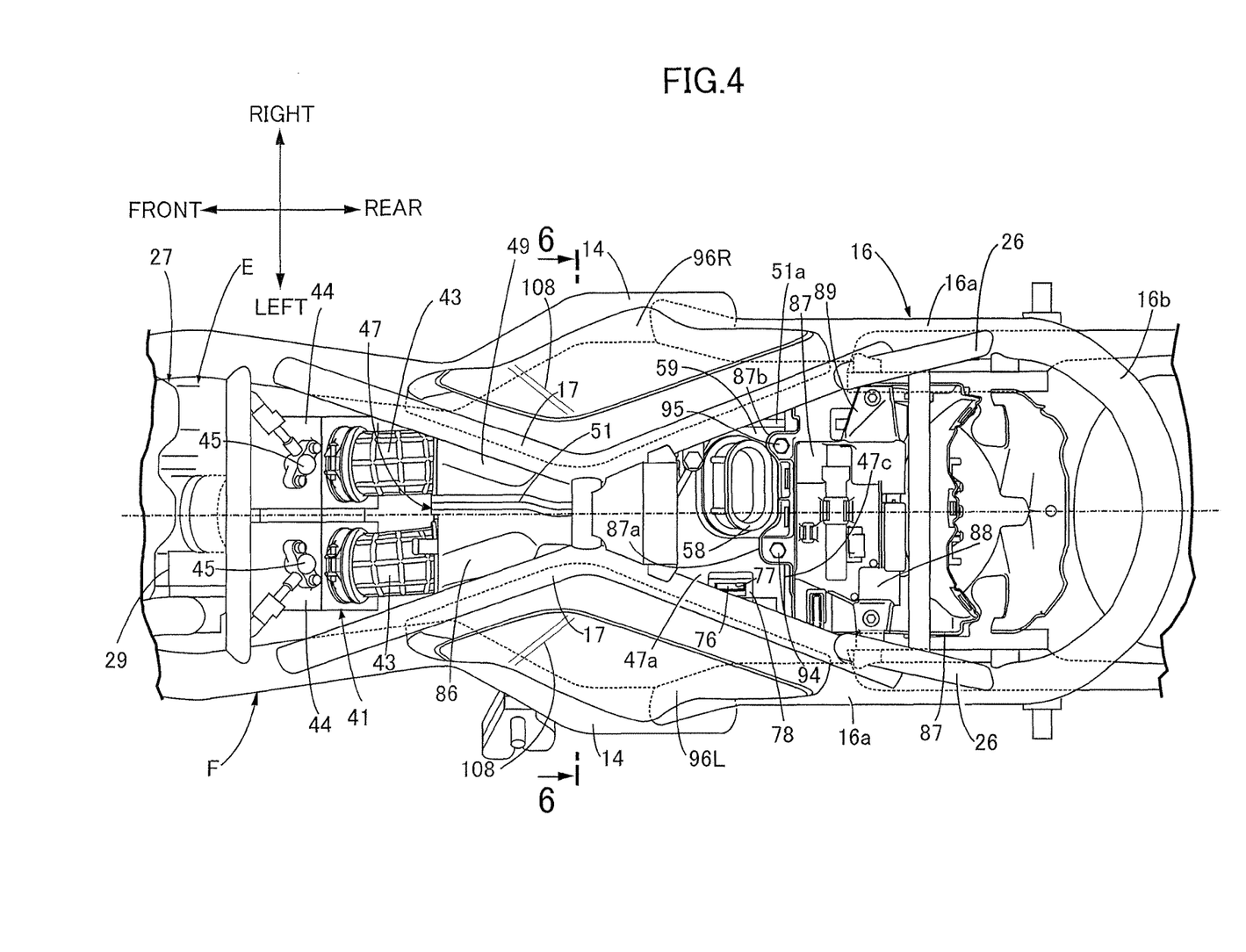
FIG. 4 is a view from arrow 4 in FIG. 3.

With reference to FIG. 3 and FIG. 4 together, an engine body 27 of a two cylinder engine E mounted in the vehicle body frame F is supported by the main frames 14 and the down frames 15 included in the vehicle body frame F. Also, a front end portion of a swing arm 32 having a rear end portion thereof pivotally supporting a rear wheel WR is swingably supported through a spindle 33 by a bracket 31 provided below the main frame 14, and a rear cushion unit 34 is provided between the rear frame 16 and the swing arm 32. Also, a fuel tank 35 arranged above the engine body 27 is supported by the main frames 14, and a riding seat 36 allowing the occupant to sit thereon and arranged behind the fuel tank 35 is supported by the rear frames 16 and the seat frames 17. Further, a rear fender 38 covering the rear wheel WR from above is attached to a pair of left and right extension frames 18. A pillion passenger seat 37 for allowing a pillion passenger to sit thereon and arranged behind the riding seat 36 is provided on the rear fender 38.

An exhaust pipe 39 having an upstream end connected to a front side wall of a cylinder head 29 in the engine body 27 extends rearward while passing below the engine body 27, and is connected to an exhaust muffler 40 arranged on a right side of the rear wheel WR.

An intake device 41 connected to a rear side wall of the cylinder head 29 includes an air cleaner 42, a pair of left and right connecting tubes 43 having upstream ends connected to the air cleaner 42, and throttle bodies 44 respectively connected to downstream ends of the connecting tubes 43. The air cleaner 42 is arranged behind the engine body 27 in the longitudinal direction of the vehicle. Fuel injection valves 45 are respectively attached to the throttle bodies 44 arranged in front of the air cleaner 42 and connected to the rear side wall of the cylinder head 29.

The intake device 41 is arranged together with the engine body 27 in a position covered by the fuel tank 35 from above. The riding seat 36 allowing the occupant to sit thereon and supported by the rear frames 16 and the seat frames 17 is arranged behind the fuel tank 35 arranged along the longitudinal direction of the vehicle, so as to cover the air cleaner 42 from above.

With reference to FIG. 5 to FIG. 8 together, a cleaner case 47 for the air cleaner 42 is configured with first and second case half bodies 48, 49, and a cover member 50. The first and second case half bodies 48, 49 made of synthetic resin are arranged in the vehicle width direction, the first and second case half bodies 48, 49 being coupled to each other by frictionally joining edge portions thereof which oppose to each other. The cover member 50 is detachably attached to the first case half body 48. The cleaner case 47 has a rectangular box-shaped cleaner case main portion 47a and a connecting tube connection portion 47b, and is configured long in the longitudinal direction of the vehicle. The cleaner case main portion 47a is configured to store and arrange a cleaner element 55 therein. The connecting tube connection portion 47b is connected with the connecting tube 43, and extends forward from a front upper portion of the cleaner case main portion 47a.

Figure 5:
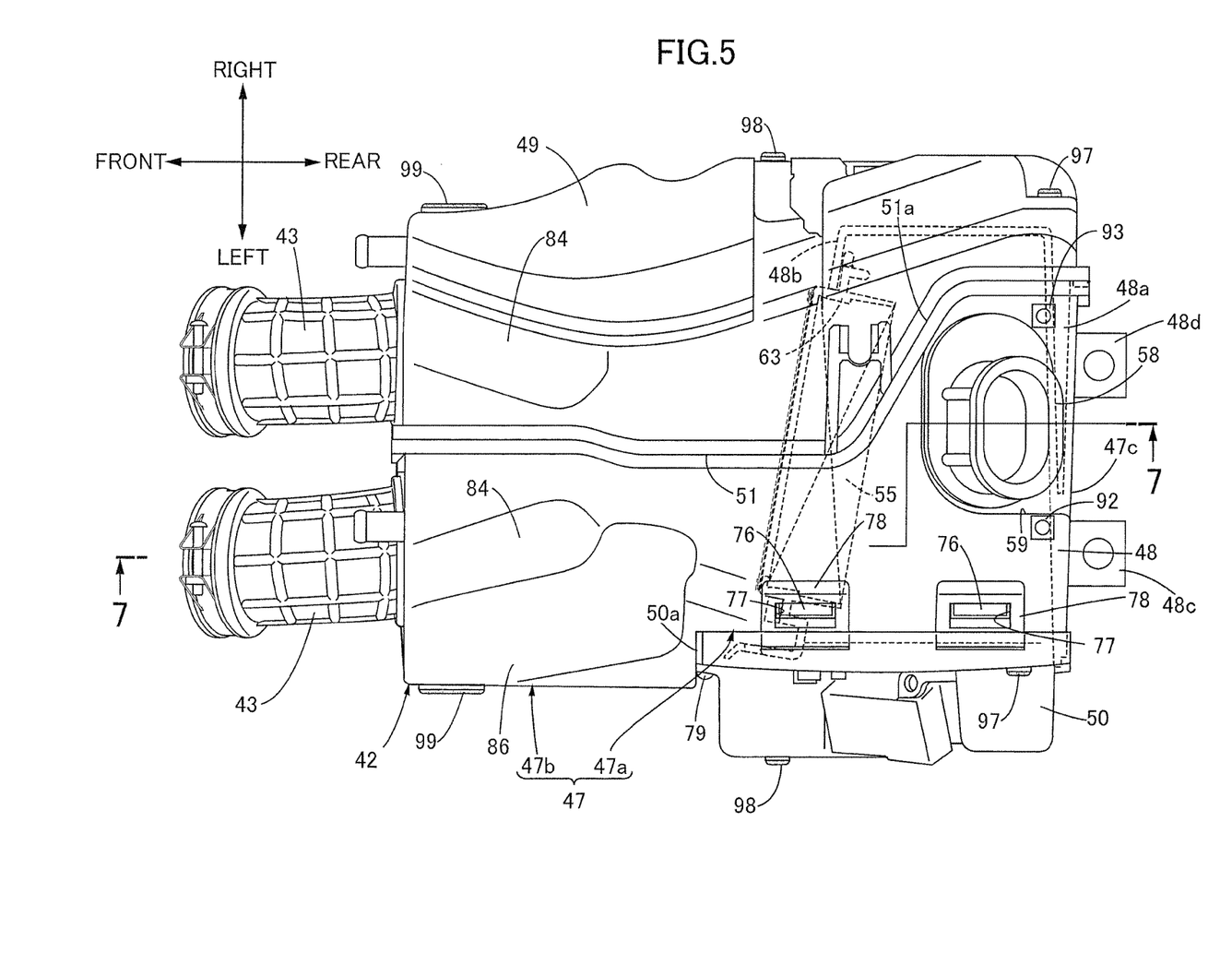
FIG. 5 is a plan view of an air cleaner.

A joint portion 51 between the first and second case half bodies 48, 49 is basically arranged along the longitudinal direction of the vehicle. An enlarged portion 48a enlarged to the second case half body 49 side is provided to the first case half body 48 so that a rear portion of the joint portion 51 is formed as a substantially L-shaped bent portion 51a as seen in a plan view.

Also, the first case half body 48 of the first and second case half bodies 48, 49 is provided with a cleaner element insertion/removal port 52, a pair of left and right purified air outlets 53, and an outside air suction port 54. The cleaner element insertion/removal port 52 is opened leftward and laterally so that the cleaner element 55 can be detachably inserted into the cleaner case main portion 47a. The pair of left and right purified air outlets 53 are connected with the connecting tubes 43 respectively. The outside air suction port 54 is configured to introduce air from the outside into the cleaner case 47. The cover member 50 for closing the cleaner element insertion/removal port is detachably attached to a left side surface of the first case half body 48.

A non-purifying chamber 57 arranged upstream of the cleaner element 55 is formed inside of the first case half body 48 in a part corresponding to the cleaner case main portion 47a. A part of the non-purifying chamber 57 is formed in the enlarged portion 48a of the first case half body 48.

A recessed portion 59 opened rearward and upward in the longitudinal direction of the vehicle is formed in a rear upper surface along the longitudinal direction of the vehicle of the enlarged portion 48a of the first case half body 48. The outside air suction port 54 is provided in a bottom surface of the recessed portion 59. The outside air suction port 54 is connected with an intermediate portion in the longitudinal direction of a suction duct 58 configured to suck the air from the outside, so that one end portion of the suction duct 58 enters the non-purifying chamber 57. The other end side of the suction duct 58 extends rearward and obliquely upward from the bottom surface of the recessed portion 59 in the recessed portion 59 so as not to protrude upward from the cleaner case 47 as seen in the side view.

The purified air outlets 53 are provided in the front end surfaces of the first and second case half bodies 48, 49 so as to correspond to the front end portion of the connecting tube connection portion 47b. Also, a purifying chamber 60 arranged downstream of the cleaner element 55 is formed in the cleaner case 47. The intermediate portions in the longitudinal direction of the connecting tubes 43 are connected to the purified air outlets 53 so that one end portion of each of the connecting tubes 43 enters the purifying chamber 60.

Figure 7:
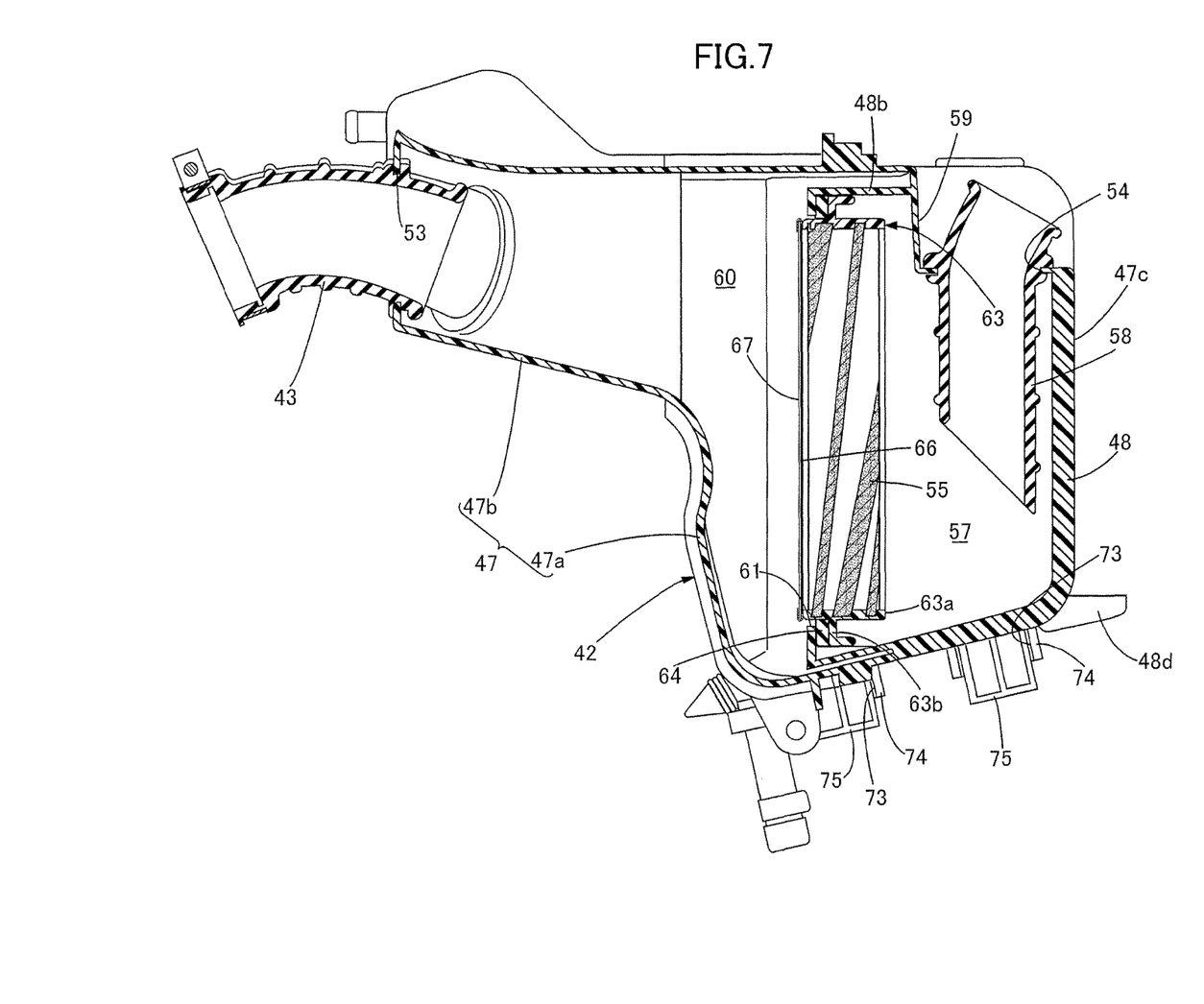
FIG. 7 is a sectional view along line 7-7 in FIG. 5.
Figure 8:
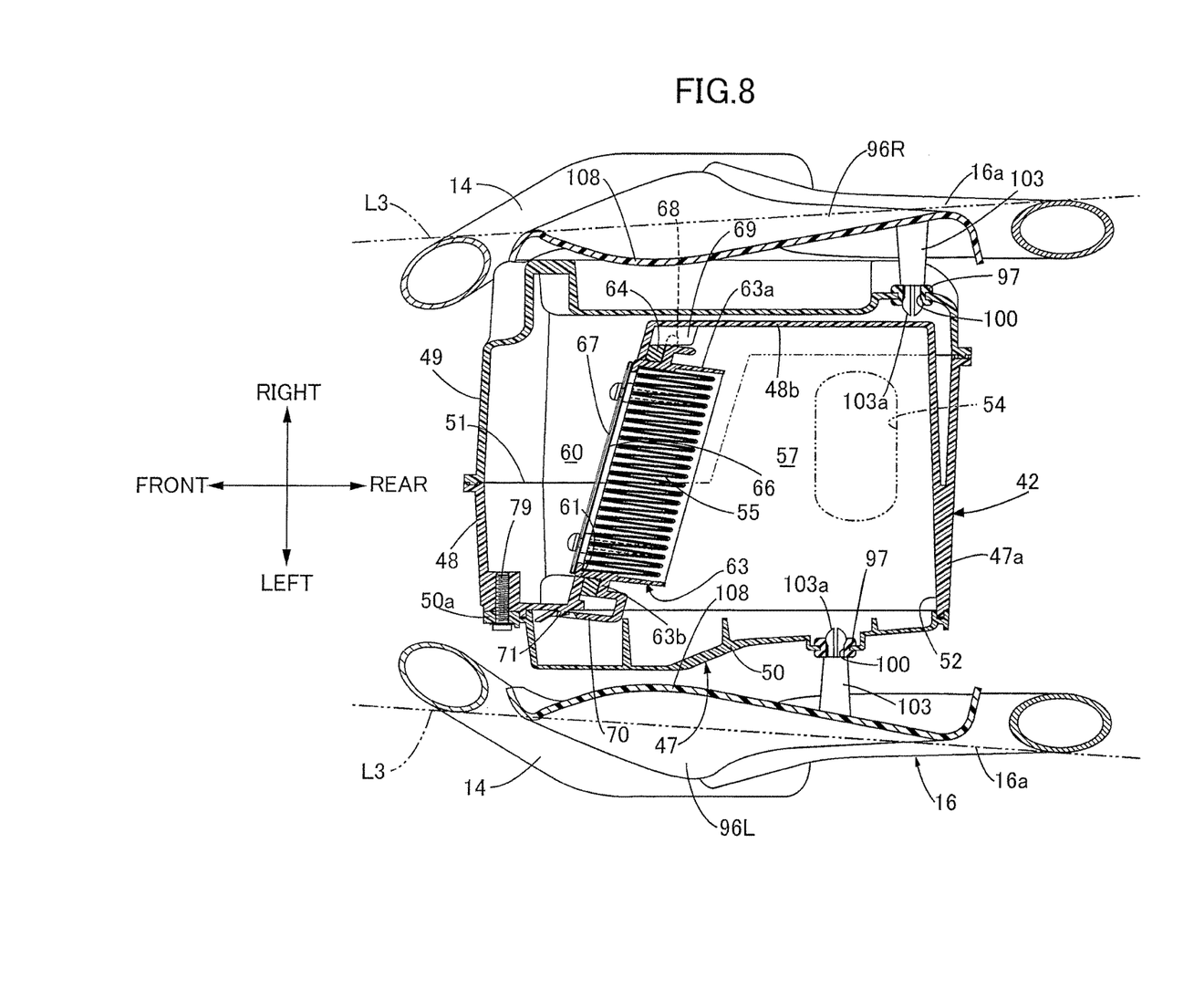
FIG. 8 is a sectional view along line 8-8 in FIG. 3.

Draw attention to FIG. 7 and FIG. 8, an element supporting wall portion 48b is provided integrally in the first case half body 48, the element supporting wall portion 48b supporting a peripheral edge portion of an element supporting frame 63 included in the cleaner element 55. The element supporting wall portion 48b is formed with a rectangular opening 61 arranged between the non-purifying chamber 57 and the purifying chamber 60. The element supporting frame 63 is formed to have a supporting tubular portion 63a and a flange portion 63b. The supporting tubular portion 63a is formed into a rectangular shape while being partially fitted into the opening 61, and also is configured to store and support the cleaner element 55 therein. The flange portion 63b is overhung to the lateral side from the supporting tubular portion 63a so as to abut against the element supporting wall portion 48b on the non-purifying chamber 57 side through an endless seal member 64.

The cleaner element 55 is covered with a metal plate 66 and a mesh member 67 from the purifying chamber 60 side. The meal plate 66 is formed with a plurality of circulation holes (not shown), and abuts against an end portion on the purifying chamber 60 side of the supporting tubular portion 63a of the element supporting frame 63. The mesh member 67 abuts against the plate 66 from the purifying chamber 60 side. The plate 66 and the mesh member 67 are fixed to the supporting tubular portion 63a.

With the cleaner element insertion/removal port 52 opened, the element supporting frame 63 can be inserted or removed by being slid in the vehicle width direction in the first case half body 48 of the cleaner case 47. In addition, a locking portion 69 is provided to the cleaner element supporting wall portion 48b, an engagement protruding portion 68 being individually engaged with the locking portion 69 from the cleaner element insertion/removal port 52 side. The engagement protruding portion 68 is provided to the element supporting frame 63 on the second case half body 49 side. Also, an engagement portion 71 is protuberantly arranged integrally with the first case half body 48 so as to be positioned on the peripheral edge portion of the cleaner element insertion/removal port 52. The engagement portion 71 protrudes toward the cleaner element insertion/removal port 52 so that a locking claw 70 provided to the element supporting frame 63 on the cover member 50 side is disengageably engaged with the engagement portion 71.

Locking portions 74 respectively having locking holes 73 are integrally provided in two positions while protruding downward. The two positions are arranged on a lower edge portion side of the cleaner element insertion/removal port 52 and are arranged at intervals in the longitudinal direction of the vehicle of the first case half body 48. Engagement protruding portions 75 respectively engaged with the locking holes 73 are provided integrally with a lower portion of the cover member 50. Also, engagement protruding portions 76 are integrally provided in two positions so as to protrude upward. The two positions are arranged on an upper edge portion side of the cleaner element insertion/removal port 52 and are arranged at intervals in the longitudinal direction of the vehicle of the first case half body 48. Locking portions 78 are integrally provided to an upper portion of the cover member 50 so as to protrude to the first case half body 48 side. The locking portions 78 have locking holes 77 for engagement with the engagement protruding portions 76.

Also, a fastening plate portion 50a is provided integrally with the cover member 50. The fastening plate portion 50a abuts against the first case half body 48 on a front edge portion side of the cleaner element insertion/removal port 52. The fastening plate portion 50a is fastened to the first case half body 48 by a screw member 79. That is, with the engagement protruding portions 75 engaged with the locking holes 73 of the first case half body 48 and the engagement protruding portions 76 of the first case half body 48 engaged with the locking holes 77, the cover member 50 is fastened to the first case half body 48 by the screw member 79.

In the meantime, as clearly specified in FIG. 4, the pair of left and right seat frames 17 arranged above the cleaner case 47 extend in the longitudinal direction of the vehicle, and also are formed in such a manner that the intermediate portions of the seat frames 17 in the longitudinal direction are bent inward in the vehicle width direction. A pair of frame relief recessed portions 84 are formed in an upper surface of the cleaner case 47. Each of the pair of frame relief recessed portions 84 stores one portion of a part of each of the pair of seat frames 17, the part being arranged above the cleaner case 47.

Also, a wire harness relief recessed portion 86 is formed in an upper surface of the first case half body 48 of the first and second case half bodies 48, 49. The wire harness relief recessed portion 86 is configured to allow passage of a part of a wire harness between the first case half body 48 and the left seat frame 17 and to store a part of the wire harness.

In the meantime, a front portion of the cleaner case 47 is supported by the engine body 27 through the throttle body 44 and the connecting tube 43 connected to the cleaner case 47.

On the other hand, a battery box 87 is arranged behind the cleaner case 47 so as to cover the recessed portion 59 from behind. A battery 88 is stored in the battery box 87, and a battery cover 89 covering a part of the battery 88 from above is fastened to an upper portion of the battery box 87. In addition, as shown in FIG. 3, the battery box 87 is fastened together with a stay 90 to a supporting plate portion 96 by a bolt 91. The supporting plate portion 96 is provided to the rear frame 16 included in the vehicle body frame F. The stay 90 is arranged inside of the battery box 87. The battery box 87 is supported by the vehicle body frame F.

Also, a pair of supporting arm portions 87a, 87b are integrally protuberantly arranged on an upper portion of a front end of the battery box 87 at intervals in the vehicle width direction while being directed upward of a rear portion 47c of the cleaner case 47. On the other hand, nuts 92, 93 are molded and joined to the upper surface of the rear portion 47c of the cleaner case 47, in the embodiment, to the rear upper surface of the first case half body 48, and the supporting arm portions 87a, 87b are fastened to the nuts 92, 93 by bolts 94, 95. Further, a pair of supporting protruding portions 48c, 48d are integrally protuberantly arranged on a lower portion of the rear portion 47c of the cleaner case 47, in the embodiment, to the lower portion on the rear side of the first case half body 48 while being directed to the battery box 87 side. The supporting protruding portions 48c, 48d are fastened to the battery box 87. That is, the rear portion 47c of the cleaner case 47 is arranged behind the cleaner case 47, and is supported by the battery box 87 supported by the vehicle body frame F.

Figure 9:
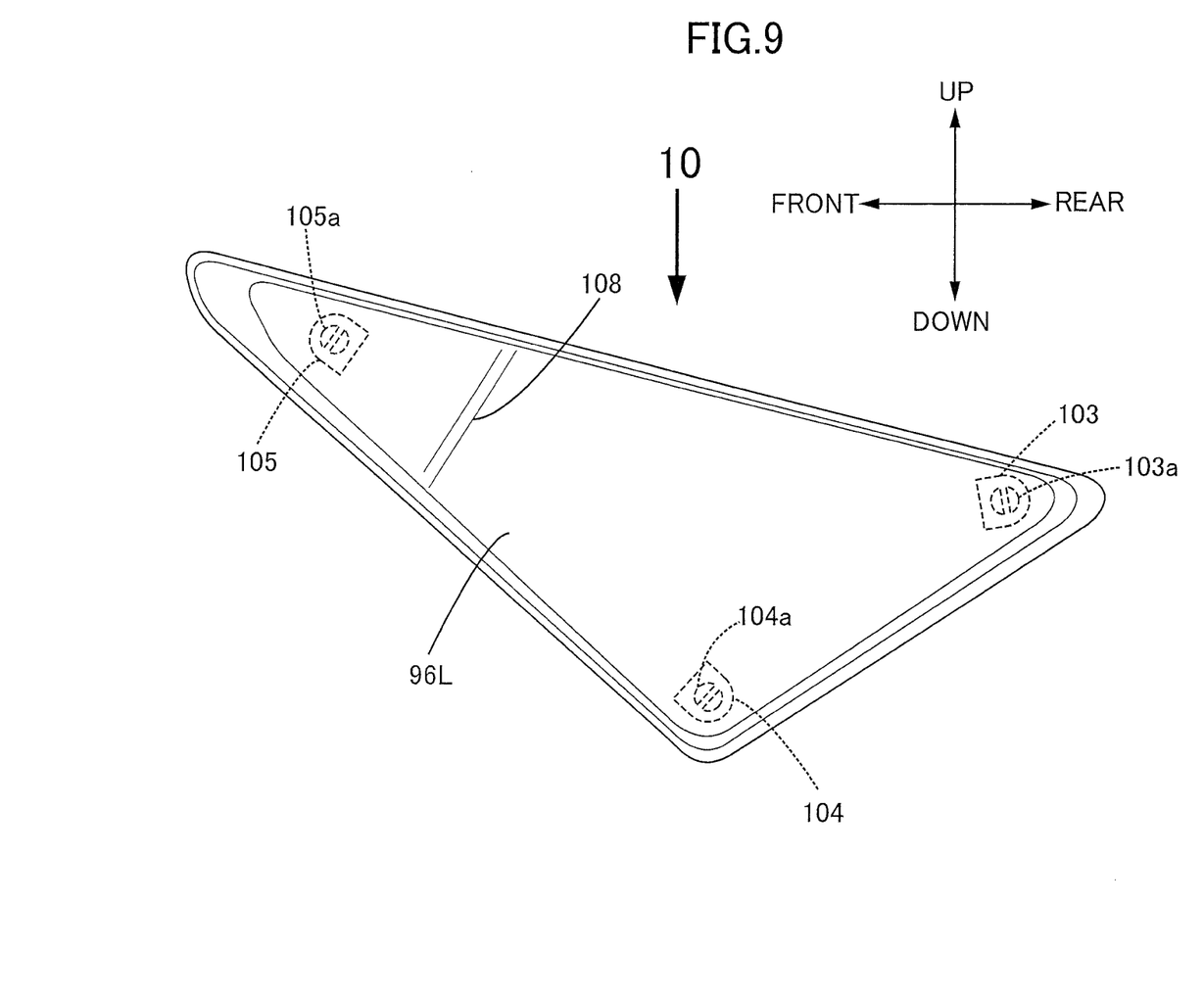
FIG. 9 is a side view of a side cover.
Figure 10:
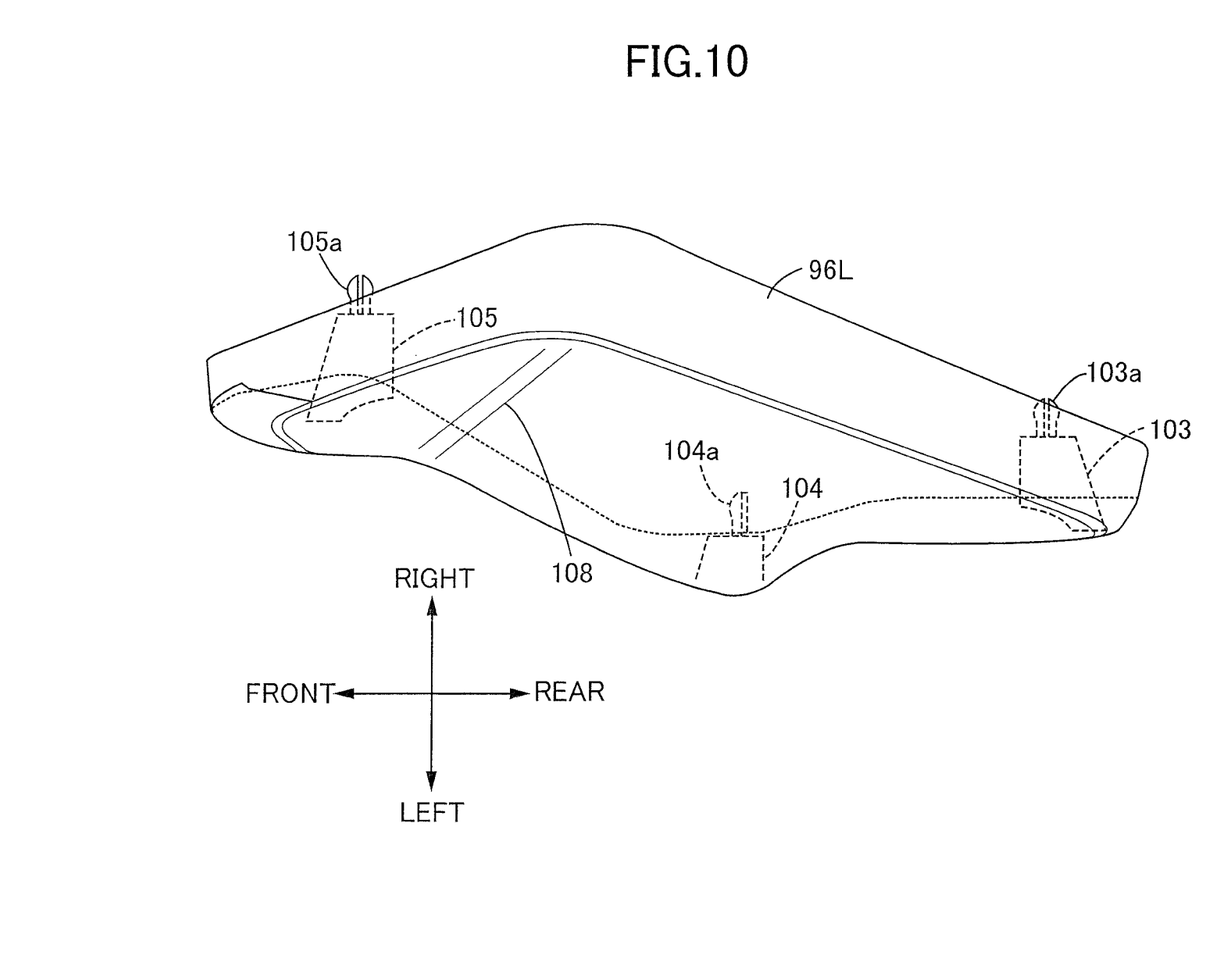
FIG. 10 is a view from arrow 10 in FIG. 9.

With reference to FIG. 9 and FIG. 10 together, the cleaner case 47 is covered from opposite sides in the vehicle width direction by a pair of left and right side covers 96L, 96R. The cleaner case 47 is configured to have the cleaner case main portion 47a and the connecting tube connection portion 47b extending forward from the cleaner case main portion 47a, and to be formed long in the longitudinal direction of the vehicle. In addition, the side covers 96L, 96R are formed to extend forward beyond a front end 36a of the riding seat 36 as seen in the side view of the vehicle. That is, the side covers 96L, 96R are formed to extend forward beyond a vertical line L1 passing through the front end 36a of the riding seat 36 as seen in the side view of the vehicle.

The side covers 96L, 96R are supported by the first, second and third side cover supporting portions 97, 98, 99 provided on the left and right opposite side walls of the cleaner case main portion 47a and the connecting tube connection portion 47b.

The first and second side cover supporting portions 97, 98 of the first, second and third side cover supporting portions 97 to 99 provided in the three positions of the side wall of the cleaner case 47 so as to support the side covers 96L, 96R are provided in the two positions, separated in the up-down direction, of the side wall of the cleaner case main portion 47a. In the embodiment, the first and second side cover supporting portions 97, 98 corresponding to the left side cover 96L are provided to the cover member 50 configuring a part of the cleaner case main portion 47a so that the first side cover supporting portion 97 is positioned on an upper side, and the first and second side cover supporting portions 97, 98 corresponding to the right side cover 96R are provided to the right side wall of the second case half body 49 configuring a part of the cleaner case main portion 47a so that the first side cover supporting portion 97 is positioned on the upper side.

Also, the rear portions and the front portions of the side covers 96L, 96R are supported by the first side cover supporting portion 97 of the first to third side cover supporting portions 97 to 99, the first side cover supporting portion 97 being provided to the cleaner case main portion 47a, and the third side cover supporting portion 98 of the first to third side cover supporting portions 97 to 99, the third side cover supporting portion 98 being provided to the connecting tube connection portion 47b. The first to third side cover supporting portions 97 to 99 are configured to form the fitting holes 100, 101, 102, and are, for example, grommets.

On the other hand, first to third supporting protruding portions 103, 104, 105 having tip end portions 103a, 104a, 105a fitted to the fitting holes 100 to 102 of the first to third side cover supporting portions 97 to 99 are protuberantly arranged on the side covers 96L, 96R. The tip end portions 103a to 105a of the first to third supporting protruding portions 103 to 105 are each divided into two pieces so as to be elastically fitted into the fitting holes 100 to 102.

The side covers 96L, 96R are each formed with a curved portion 108 recessed inward in the vehicle width direction between the first side cover supporting portion 97 and the third side cover supporting portion 99, that is, between the first and third supporting protruding portions 103 and 105. The first side cover supporting portion 97 is provided to the cleaner case main portion 47a in order to support the rear portions and the front portions of the side covers 96L, 96R, and the third side cover supporting portion 99 is provided to the connecting tube connection portion 47b.

Incidentally, the left and right side covers 96L, 96R are basically formed symmetrically. However, if it is difficult to symmetrically set arrangement positions of the first to third side cover supporting portions 97 to 99 in the side covers 96L, 96R due to a shape of the cleaner case 47, the arrangement positions of the first to third supporting protruding portions 103 to 105 may be different in the left and right side covers 96L, 96R. In the embodiment, as shown in FIG. 8, the first side cover supporting portion 97 and the first supporting protruding portion 103 corresponding to the right side cover 96R are arranged rearward in the longitudinal direction of the vehicle in comparison with the first side cover supporting portion 97 and the first supporting protruding portion 103 corresponding to the left side cover 96L.

In addition, the first to third side cover supporting portions 97 to 99 are provided to the side wall of the cleaner case 47 at intervals in the longitudinal direction of the vehicle. The fitting hole 100 or 102 formed in the first or third side cover supporting portion 97 or 99 of the first to third side cover supporting portions 97 to 99, in the embodiment, the fitting hole 102 formed in the third side cover supporting portion 99 on the foremost side is formed long along the longitudinal direction of the vehicle so that the tip end portion 105a of the third supporting protruding portion 105 can be slid along the longitudinal direction of the vehicle, as shown in FIG. 3.

Also, as seen in the side view of the vehicle, the side covers 96L, 96R are arranged to be surrounded by the main frames 14, the rear frames 16 and the seat frames 17. The side covers 96L, 96R are arranged in the opening 106. The opening 106 is configured with the main frames 14, the rear frames 16 and the seat frames 17, and is formed into the triangular shape as seen in the side view of the vehicle.

Figure 6:
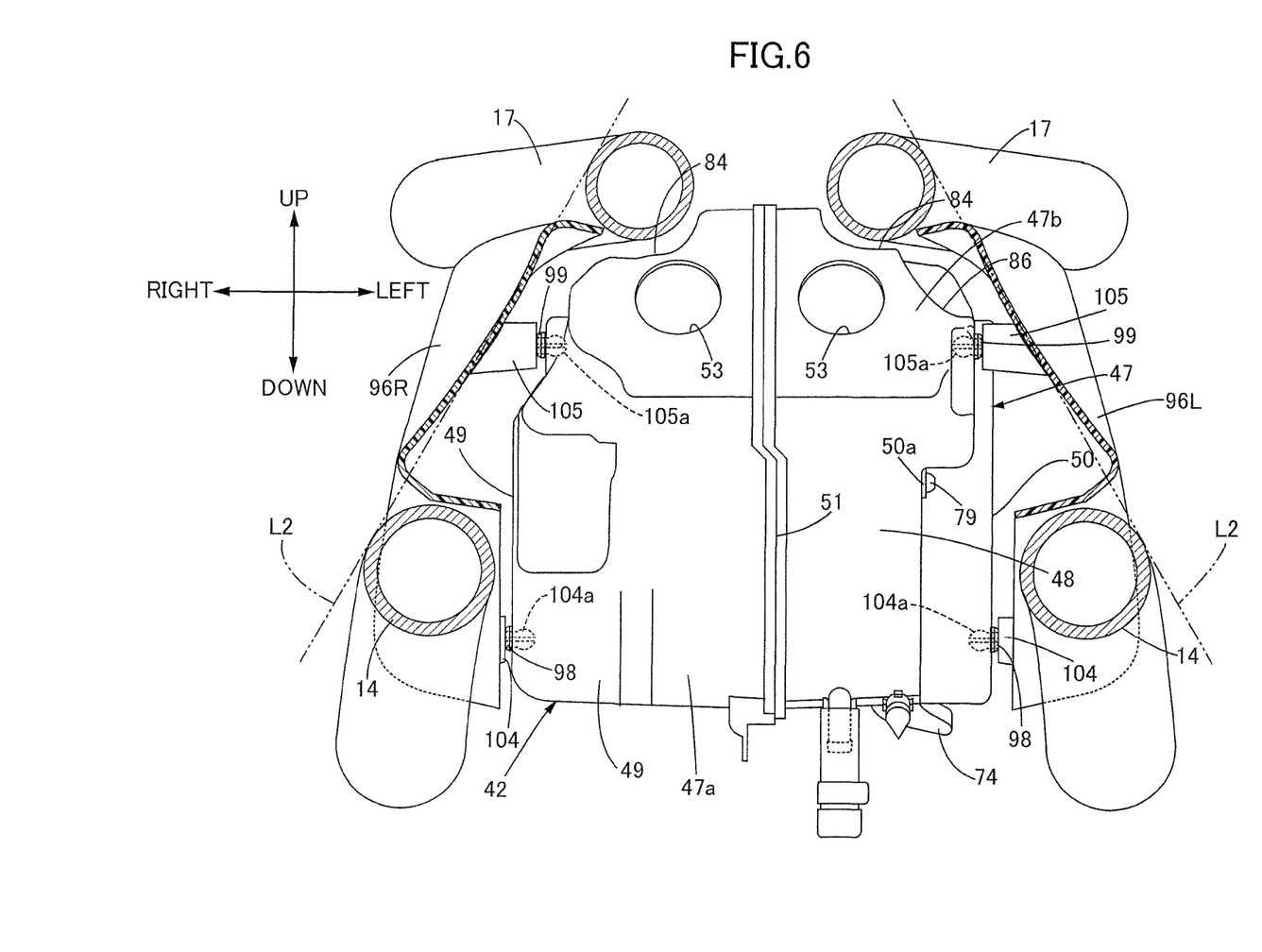
FIG. 6 is a sectional view along line 6-6 in FIG. 4.

In addition, as shown in FIG. 6, in the projection view with respect to a vertical plane arranged along the vehicle width direction, the outer surface of each of the side covers 96L, 96R is arranged along a straight line L2 connecting the outer end in the vehicle width direction of the seat frame 17 existing above the air cleaner 42 and the outer end in the vehicle width direction of the main frame 14. Also, as shown in FIG. 8, in the projection view with respect to the horizontal plane, the outer surface of each of the side covers 96L, 96R is formed to be arranged substantially along a straight line L3 connecting the outer ends in the vehicle width direction of the main frame 14 and the rear frame 16.

Next, operation of the embodiment will be described. The cleaner case 47 for the air cleaner 42 arranged below the riding seat 36 has the cleaner case main portion 47a storing the cleaner element 55, and the connecting tube connection portion 47b extending forward from the cleaner case main portion 47a so as to be connected with the connecting tube 43. The cleaner case 47 is configured long in the longitudinal direction of the vehicle. The pair of left and right side covers 96L, 96R covering the cleaner case 47 from the opposite sides in the vehicle width direction are supported by the first, second and third side cover supporting portions 97, 98, 99 provided to the left and right opposite side walls of the cleaner case main portion 47a and the connecting tube connection portion 47b. With this arrangement, the front portions and the rear portions of the side covers 96L, 96R are supported by the cleaner case 47, the interval between the air cleaner 42 and the side covers 96L, 96R in the vehicle width direction is shortened, and the straddling portion of the riding seat 36 is thinned by avoiding overhanging of the side covers 96L, 96R to the outer side in the vehicle width direction. For this reason, the straddling performance can be improved, and in addition, the capacity of the air cleaner 42 can be secured.

Also, the first and second side cover supporting portions 97, 98 of the first, second and third side cover supporting portions 97 to 99 provided in the three positions of the side wall of the cleaner case 47 so as to support each of the side covers 96L, 96R are provided in the two positions, separated in the up-down direction, of the side wall of the cleaner case main portion 47a. With this arrangement, the side covers 96L, 96R are supported in three positions by the cleaner case 47. For this reason, the side covers 96L, 96R can be stably supported by the cleaner case 47, and the number of components can be reduced without providing an exclusive member such as the bracket and the like for supporting the side covers 96L, 96R to the vehicle body frame F side.

Also, the side covers 96L, 96R are formed to extend forward beyond the front end 36a of the riding seat 36 as seen in the side view of the vehicle. The rear portion and the front portion of each of the side covers 96L, 96R are supported by the first side cover supporting portion 97 and the third side cover supporting portion 99 of the first to third side cover supporting portions 97 to 99, the first side cover supporting portion 97 being provided to the cleaner case main portion 47a, the third side cover supporting portion 99 being provided to the connecting tube connection portion 47b. The side covers 96L, 96R are each curvedly formed to be recessed inward in the vehicle width direction between the first and third side cover supporting portions 97, 99. For this reason, the straddling performance for the occupant can be further improved, and the riding comfortableness can be improved.

Also, the first to third side cover supporting portions 97 to 99 are configured to be formed with the fitting holes 100, 101, 102, the tip end portions 103a, 104a, 105a of the first to third supporting protruding portions 103, 104, 105 being fitted and supported in the fitting holes 100, 101, 102, the first to third supporting protruding portions 103, 104, 105 being protuberantly arranged to the side covers 96L, 96R. The fitting hole 100 or 102 formed in the first or third side cover supporting portion 97 or 99 of the first to third side cover supporting portions 97 to 99 provided to the side wall of the cleaner case 47 at intervals in the longitudinal direction of the vehicle, in the embodiment, the fitting hole 102 formed in the third side cover supporting portion 99 is formed long along the longitudinal direction of the vehicle so that the tip end portion 105a of the third supporting protruding portion 105 fitted into the fitting hole 102 can be slid along the longitudinal direction of the vehicle. For this reason, with respect to a straddling and sandwiching load on the side covers 96L, 96R by the legs of the occupant seated on the riding seat 36, the load can be dispersed by sliding the rear portions or the front portions of the side covers 96L, 96R to the rear side or the front side, and the weight of the side covers 96L, 96R can be reduced.

Also, the front portion of the cleaner case 47 is supported through the connecting tube 43 and the throttle body 44 by the engine body 27 mounted in the vehicle body frame F, and the rear portion 47c of the cleaner case 47 is supported by the battery box 87 arranged behind the cleaner case 47 and supported by the vehicle body frame F. With this structure, since the rear portion 47C of the cleaner case 47 is supported by the battery box 87 storing the heavy battery 88, with vibration from the vehicle body absorbed, the rear portion of the cleaner case 47 is supported, and the rear portion and the front portion of the air cleaner 42 are isolated from vibration from the vehicle body. For this reason, transmission of the vibration from the engine body 27 to the side covers 96L, 96R can be reduced, and the riding comfortableness can be improved.

Also, as seen in the side view of the vehicle, the main frames 14, the rear frames 16, and the seat frames 17 are arranged to surround the side covers 96L, 96R. With this structure, the side covers 96L, 96R can be protected from the load from a periphery thereof, by the vehicle body frame F, and a direction for applying the load on the side covers 96L, 96R is made to be directed to only a direction of supporting the side covers on the cleaner case 47. For this reason, durability of the supporting portions which support the side covers 96L, 96R on the cleaner case 47 can be improved.

Also, the intermediate portions of the seat frames 17 in the longitudinal direction are formed to be bent inward in the vehicle width direction, and the side covers 96L, 96R are arranged in the opening 106 configured with the main frames 14, the rear frames 16 and the seat frames 17 and formed into the triangular shape as seen in the side view of the vehicle. For this reason, the interval between the pair of left and right seat frames 17 can be narrowed in a part in which the occupant seated on the riding seat 36 straddles, and the side covers 96L, 96R are arranged in the opening 106 formed into the triangular shape as seen in the side view of the vehicle. For this reason, the straddling space for the occupant can be thinned, and the vehicle body can be miniaturized in the vehicle width direction.

An embodiment of the present invention is explained above, but the present invention is not limited to the above-mentioned embodiment and may be modified in a variety of ways as long as the modifications do not depart from the gist of the present invention.

What is claimed is:
1. A saddle-ride type vehicle in which,
   a riding seat is supported by a vehicle body frame including a head pipe steerably supporting a steering handlebar and a pair of left and right main frames extending rearward from the head pipe, and
   an air cleaner is arranged inward in a vehicle width direction of at least the pair of left and right main frames of the vehicle body frame and arranged below the riding seat,
   wherein a cleaner case for the air cleaner is configured long in a longitudinal direction of the vehicle, and has a cleaner case main portion and a connecting tube connection portion, the cleaner case main portion storing therein a cleaner element, the connecting tube connection portion extending forward from the cleaner case main portion so as to be connected to the connecting tube, and
   a pair of left and right side covers are supported by side cover supporting portions, the pair of left and right side covers covering the cleaner case from opposite sides in the vehicle width direction, the side cover supporting portions being provided on left and right opposite side walls of the cleaner case main portion and the connecting tube connection portion.
2. The saddle-ride type vehicle according to claim 1, wherein the first and second side cover supporting portions of the first, second and third side cover supporting portions are provided in two positions, separated in an up-down direction, of a side wall of the cleaner case main portion, the first, second and third side cover supporting portions being provided in three positions of the side wall of the cleaner case so as to support each of the side covers.
3. The saddle-ride type vehicle according to claim 2,
   wherein the side covers are formed to extend forward beyond a front end of the riding seat as seen in a side view of the vehicle,
   the side covers each have a rear portion and a front portion supported by the first side cover supporting portion and the third side cover supporting portion of the first to third side cover supporting portions, the first side cover supporting portion being provided to the cleaner case main portion, the third side cover supporting portion being provided to the connecting tube connection portion, and the side covers are each formed with a curved portion, the curved portion being recessed inward in the vehicle width direction between the first and third side cover supporting portions.

4. The saddle-ride type vehicle according to claim 2, wherein the first to third side cover supporting portions are configured to be formed with fitting holes, tip end portions of first to third supporting protruding portions being fitted and supported in the fitting holes, the first to third supporting protruding portions being protuberantly arranged to each of the side covers, and the fitting hole of the first or third side cover supporting portion of the first to third side cover supporting portions is formed long along the longitudinal direction of the vehicle while allowing the tip end portion of the first or third supporting protruding portion fitted into the fitting hole to slide along the longitudinal direction of the vehicle, the first to third side cover supporting portions being provided to the side wall of the cleaner case at intervals in the longitudinal direction of the vehicle.

5. The saddle-ride type vehicle according to claim 1, wherein the cleaner case has a front portion supported through the connecting tube by an engine body that is mounted in the vehicle body frame, and a rear portion supported by a battery box that is arranged behind the cleaner case and supported by the vehicle body frame.

6. The saddle-ride type vehicle according to claim 5, wherein the vehicle body frame includes a pair of left and right rear frames and a pair of left and right seat frames in addition to the head pipe and the pair of left and right main frames, the pair of left and right rear frames extending upward to a rear from lower portions of the main frames, the pair of left and right seat frames each connecting intermediate portions in a longitudinal direction of the main frame and the rear frame to each other and being arranged below the riding seat, and the main frames, the rear frames, and the seat frames are arranged to surround the side covers as seen in the side view of the vehicle.

7. The saddle-ride type vehicle according to claim 6, wherein the intermediate portions of the seat frames in the longitudinal direction are formed to be bent inward in the vehicle width direction, and the side covers are arranged in an opening, the opening being configured with the main frames, the rear frames and the seat frames and formed into a triangular shape as seen in the side view of the vehicle.

8. The saddle-ride type vehicle according to claim 2, wherein the cleaner case has a front portion supported through the connecting tube by an engine body that is mounted in the vehicle body frame, and a rear portion supported by a battery box that is arranged behind the cleaner case and supported by the vehicle body frame.

9. The saddle-ride type vehicle according to claim 3, wherein the cleaner case has a front portion supported through the connecting tube by an engine body that is mounted in the vehicle body frame, and a rear portion supported by a battery box that is arranged behind the cleaner case and supported by the vehicle body frame.

10. The saddle-ride type vehicle according to claim 4, wherein the cleaner case has a front portion supported through the connecting tube by an engine body that is mounted in the vehicle body frame, and a rear portion supported by a battery box that is arranged behind the cleaner case and supported by the vehicle body frame.

* * * * *